United States Patent [19]

Saito et al.

[11] Patent Number: 5,083,687
[45] Date of Patent: Jan. 28, 1992

[54] NOZZLE FOR CONTINUOUS CASTING AND METHOD OF PRODUCING

[75] Inventors: Mitsuo Saito; Kenichi Sorimachi; Toshikazu Sakuraya, all of Chiba, Japan

[73] Assignee: Kawasaki Steel Corporation, Kobe, Japan

[21] Appl. No.: 598,040

[22] Filed: Oct. 16, 1990

[30] Foreign Application Priority Data

Oct. 19, 1989 [JP] Japan ................... 1-270322
Sep. 5, 1990 [JP] Japan ................... 2-233210

[51] Int. Cl.$^5$ .................. B22D 41/54; B22D 11/10
[52] U.S. Cl. ...................... 222/591; 164/437; 222/606
[58] Field of Search ............. 164/437, 488; 222/606, 222/591, 590, 594

[56] References Cited

FOREIGN PATENT DOCUMENTS

| | | | |
|---|---|---|---|
| 2500773 | 9/1982 | France | 222/591 |
| 53-43712 | 4/1978 | Japan | 222/591 |
| 56-139260 | 10/1981 | Japan | 222/591 |
| 57-7868 | 1/1982 | Japan | 222/591 |
| 57-92572 | 6/1982 | Japan | 222/591 |

Primary Examiner—Kuang Y. Lin
Attorney, Agent, or Firm—Dvorak and Traub

[57] ABSTRACT

A nozzle for use in continuous casting comprising an inner surface region defining the nozzle port for passing a molten steel, said inner surface region being formed from a mixture having a composition containing 50 to 80 wt % of boron nitride (BN) and 20 to 50 wt % of zirconium oxide ($ZrO_2$), and a sintering assistant composed of silicon carbide (SiC) and boron carbide ($B_4C$) mixed at a weight ratio of 1:1, the sintering assistant being added in amount of 5 to 10 wt parts to 100 wt parts of said mixture. The nozzle is produced by a process comprising the steps of: forming a uniform mixture of fine particles of boron nitride (BN), zirconium oxide ($ZrO_2$), silicon carbide (SiC) and boron carbide ($B_4C$); forming the mixture into a cylindrical blank; and fixing the cylindrical blank in the bore of a nozzle member by means of a joint filling material.

1 Claim, 6 Drawing Sheets

NOZZLE FOR CONTINUOUS CASTING AND METHOD OF PRODUCING

BACKGROUND OF THE INVENTION

1. Field of the Invention

The present invention relates to a nozzle used in a continuous casting process for pouring a molten metal such as molten steel from a ladle into a tundish or from the tundish to a mold. More particularly, the present invention is concerned with a nozzle for use in continuous casting which is improved to prevent deposition of non-metallic inclusions in the molten metal to the surface of the nozzle wall defining the passage for the molten metal.

2. Description of the Related Art

In general, a nozzle for continuous casting has suffered from a problem in that particles of non-metallic inclusions such as alumina contained in the poured steel such as killed steel are undesirably deposited to the surface of the nozzle during continuous casting. As a consequence, the inside diameter of the nozzle port is progressively decreased to restrict and block the nozzle port, with the result that the pouring of the molten steel and, hence, the continuous casting are hampered.

In order to obviate this problem, it has been proposed to provide a porous portion in the surface of the nozzle port and to have an inert gas blown into the nozzle port through the porous portion, thereby preventing deposition of the non-metallic inclusions.

This method, however, is still unsatisfactory in that it is impossible to blow the inert gas over the entire area of the inner surface of the nozzle port. In addition, this method cannot be applied to some types of steel because voids tend to be generated in the cast slab.

Under these circumstance, attempts have been made to prevent deposition of non-metallic inclusions by improving the material of the surface region of the nozzle port, without relying upon the blowing of inert gas.

For instance, Japanese Patent Publication No. 2-12664 discloses a nozzle in which the inner peripheral region of the nozzle wall defining the nozzle port is made of a material containing 90 to 50 wt % of MgO and 10 to 50 wt % of C, while the outer peripheral region of the nozzle wall is formed from a sintered refractory material of $Al_2O_3$-C type.

On the other hand, Japanese Patent Laid-Open Publication No. 56-139260 discloses a nozzle in which the inner surface region of the nozzle wall, 3 to 15 mm thick as measured from the inner peripheral surface, is made, through a forming by a rubber press and sintering, from a material containing 5 to 80 wt % of boron and the balance one, two or more materials selected from the group consisting of graphite (C), alumina ($Al_2O_3$), mullite ($3A_2O_3.2SiO_2$), zircon ($ZrO_2.SiO_2$), zirconia ($ZrO_2$), metallic silicon (Si) and silicon carbide (SiC).

The nozzle disclosed in the aforementioned Japanese Patent Publication No. 2-12664 remarkably diminishes deposition of alumina-type inclusions and exhibits a large resistance against melt down by the heat of the molten steel, because the surface region of the nozzle port is made from a material containing 50 to 90 wt % of MgO. On the other hand, however, this nozzle tends to suffer from cracking due to a large thermal expansion coefficient as compared with conventional $Al_2O_3$-C nozzle. In addition, this nozzle exhibits inferior anti-spalling characteristics. Thus, the MgO-C type nozzle cannot be used with satisfaction because of a too small yield and because of large tendency of cracking particularly when the operating conditions are strict, although it provides an appreciable improvement in anti-erosion characteristics, as well as in prevention of blocking due to deposition of non-metallic inclusions.

The nozzle proposed in Japanese Patent Laid-Open Publication No. 56-139260 contains 5 to 80 wt % of BN and 20 to 95 wt % in total of one, two or more of additives such as C, $Al_2O_3$, $3Al_2O_3.2SiO_2$, $ZrO_2.SiO_2$, $ZrO_2$, Si and SiC in the form of grains having a grain size not greater than 0.5 mm. When a coarse grains are used, part of the grain is melted down by the molten steel so as to progressively coarsen the inner surface of the nozzle wall defining the nozzle port so as to promote deposition of non-metallic inclusions. In consequence, the passage for the molten steel in the nozzle port is progressively restricted to impede safe continuous casting operation. Thus, the nozzle of this type can effectively prevent deposition of non-metallic inclusions only in the beginning period of casting, and cannot stand up against repeated cycles of continuous casting. Conversely, when the additive or additives used are in the form of fine grains, the strength of the inner surface region of the nozzle wall defining the nozzle port is small, so that the surface exhibits a large rate of melt down into the molten steel, as well as large rate of wear due to friction with the molten steel. Thus, the nozzle of this type undesirably allows mixing of the nozzle wall material into the molten steel and cannot withstand a long use and, therefore, cannot be used suitably for repeated cycles of continuous casting.

SUMMARY OF THE INVENTION

Accordingly, an object of the present invention is to provide a nozzle for continuous casting in which the inner surface region of the nozzle wall defining the nozzle port is made of a material which resists to deposition of non-metallic inclusions in the molten metal and which has large resistances both to local melt-down and wear down caused by the molten metal, thereby obviating the above-described problems of the prior art without requiring blowing of inert gas.

Another object of the present invention is to provide a method of producing the nozzle.

To this end, according to one aspect of the present invention, there is provided a nozzle for use in continuous casting comprising an inner surface region defining the nozzle port for passing a molten steel, the inner surface region being formed from a mixture having a composition containing 50 to 80 wt % of boron nitride (BN) and 20 to 50 wt % of zirconium oxide ($ZrO_2$), and a sintering assistant composed of silicon carbide (SiC) and boron carbide ($B_4C$) mixed at a weight ratio of 1:1, the sintering assistant being added in amount of 5 to 10 wt parts to 100 wt parts of the mixture.

According to another aspect of the present invention, there is provided a method of producing a nozzle for continuous casting comprising the steps of: forming a uniform mixture of fine particles of boron nitride (BN), zirconium oxide ($ZrO_2$), silicon carbide (SiC) and boron carbide ($B_4C$); forming the mixture into a cylindrical blank; and fixing the cylindrical blank in the bore of a nozzle member by means of a joint filling material.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
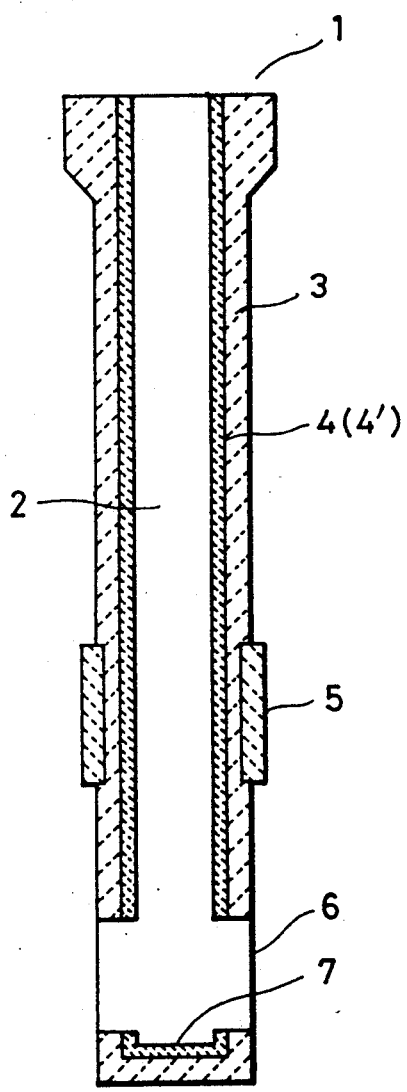
FIGS. 1 to 4 are sectional views of different embodiments of the nozzle in accordance with the present invention.

According to the present invention, the inner surface region of the of the nozzle wall is made of a material containing boron nitrides (BN) which exhibits very small wettability to non-metallic inclusions, i.e., very small tendency for deposition of non-metallic inclusions, and zirconium oxide ($ZrO_2$) which exhibits a large resistance to erosion caused by the molten steel, as well as small wettability to non-metallic inclusions.

Contents of these components are limited for the following reasons. Boron nitride content exceeding 80 wt % makes it difficult to sinter the material, with the results that the strength and erosion resistance are reduced to unsatisfactorily low levels. On the other hand, boron nitride content below 50 wt % impairs resistance to thermal shock and wettability and increases tendencies for cracking and deposition of non-metallic inclusions. For these reasons, the content of boron nitride is determined to range between 50 and 80 wt %.

Zirconium oxide content exceeding 50 wt % undesirably reduces the content of boron nitride which provides large anti-wetting characteristic so as to reduce the effect of preventing deposition of non-metallic inclusions. On the other hand, zirconium oxide content below 20 wt % seriously impairs the resistance to erosion caused by molten steel. For these reasons, the zirconium oxide content is determined to range between 20 and 50 wt %.

Boron nitride has a specific gravity of 2.3, while the specific gravity of zirconium oxide is 6.1. Thus, there is a large difference in the specific gravity between these materials. In order to sinter these materials together at a good balance, silicon carbide (SiC) and boron carbide ($B_4C$), which have specific gravities intermediate between these materials, are used as the sintering assistants. Both silicon carbide and boron carbide are used in combination at a ratio of 1:1, since a greater effect is produced when they are used in combination at the same ratio than when either one of them is used alone.

The total content of the sintering assistants should not exceed 10 wt parts to 100 wt parts of said BN and $ZrO_2$ mixture, because the inner surface of the nozzle is undesirably coarsened when the content exceeds 10 wt. Conversely, total content of sintering assistant below 5 wt parts to 100 wt parts of said BN and $ZrO_2$ mixture cannot provide strength large enough to enable the nozzle to withstand actual casting operation.

A description will be given of a method of producing a continuous casting nozzle of the present invention.

Articles of the above-mentioned components, i.e., boron nitride, zirconium oxide, silicon carbide and boron carbide, preferably having small grain sizes of 5 μm or smaller, are wet-kneaded uniformly in a pot mill so as to form a uniform mixture. The mixture is then formed into a cylindrical blank 4' shown in FIG. 1 in accordance with one of the following processes:

(1) forming by application of vertical hydrostatic load by means of dies.

Figure 2:
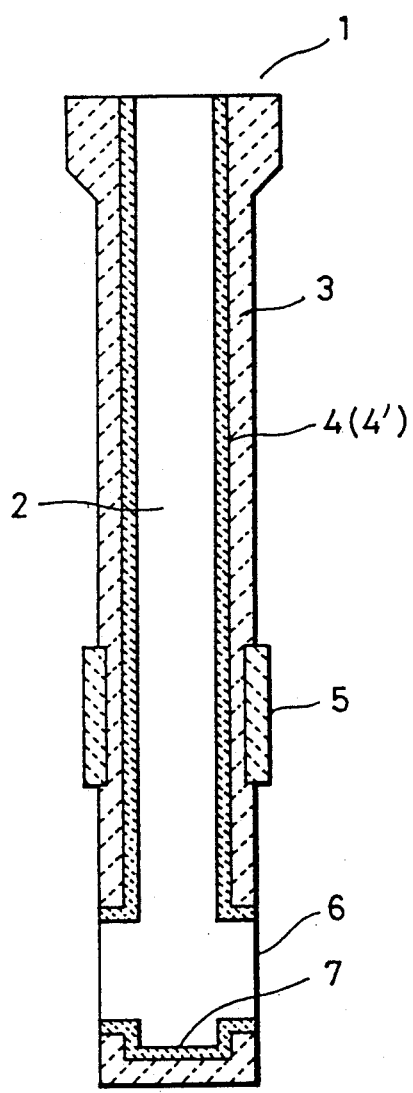

(2) filling a gypsum mold with an aqueous solution of water slurry (3) forming by a rubber press (4) forming by a hot press The cylindrical blank may have a tubular form as the member 4' shown in FIG. 1. In case of an immersed nozzle for continuous casting having two or more nozzle ports, the cylindrical blank can have a crucible-like form as shown in FIG. 2, with a sintered member 7 placed on the bottom thereof.

The cylindrical blank 4' is fitted in a bore 2 formed in a nozzle member made of a sintered refractory material such as $A_2O_3$-C and is fixed therein by means of a joint filling material.

A description will now be given of a method of producing an integral continuous casting nozzle.

Fine particles of the components, i.e., boron nitride, zirconium oxide, silicon carbide and boron carbide are mixed at the specified ratio and are kneaded so as to form a uniform mixture. Then, a binder, which is one, two or more selected from a group consisting of tar pitch, phenol resin, furan resin and polyester resin, is added to the mixture and the thus formed mixture is pelletized by a pelletizer into pellets which size preferably ranging between 1 and 2 mm although this size is not exclusive.

Figure 5:
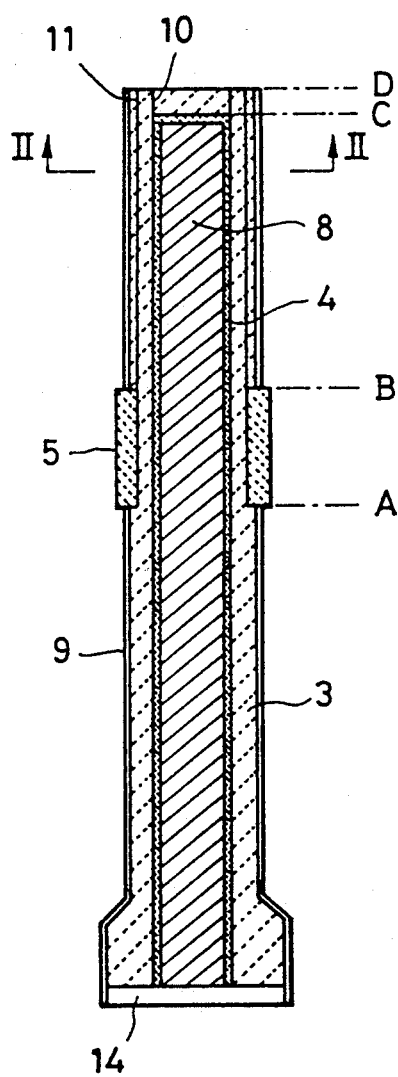
FIG. 5 is a sectional view of a nozzle forming mold which is being filled with a composition.
Figure 6:
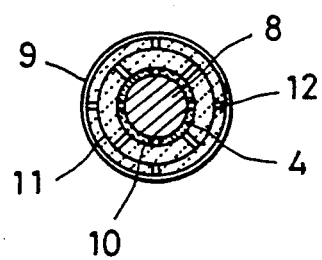
FIG. 6 is a sectional view taken along the line II—II of FIG. 5.

FIG. 5 illustrates a nozzle forming mold filled with the sintering composition. A core 8 is situated on a bottom 14 so as to stand upright therefrom. An inner partition mold wall 10 and an outer partition mold wall 11 are situated around the core 8 and are held together by stays 12. The inner partition mold wall 10 extends from the bottom to a level D, while the outer partition mold wall 11 extends over the region between the level D and a level A. A rubber forming mold wall 9, which constitutes the outermost mold component, is disposed to surround the described components of the mold. A mold wall corresponding to an outer peripheral slag line to be formed in the outer wall of the nozzle is provided at the midst of the rubber forming mold wall 9 in the region between the levels A and B.

The process for producing the continuous casting nozzle is as follows. As the first step, the annular gap between the rubber forming mold wall 9 and the inner partition mold wall 10 is filled with the grains of $Al_2O_3$-C up to the level B and, at the same time, the outer peripheral portion corresponding to the slag line is charged with the grains of $ZrO_2$-C.

Figure 7:
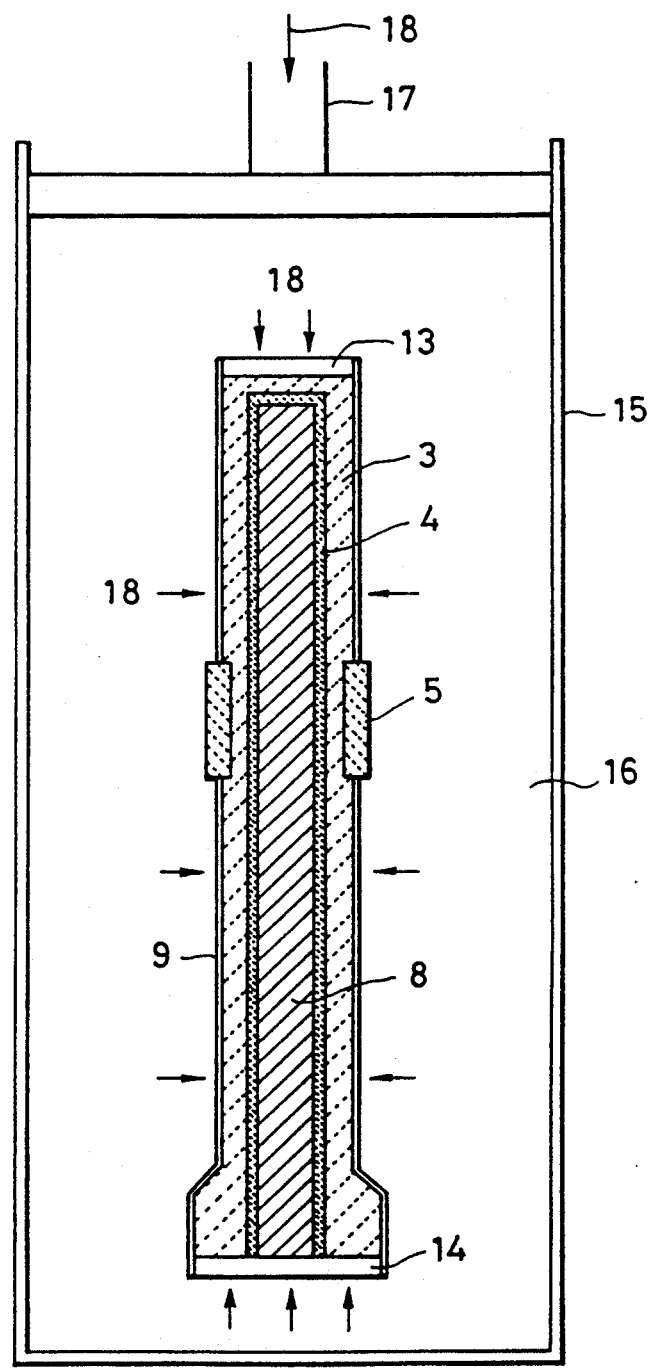
FIG. 7 is an illustration of a nozzle which is being formed.

Subsequently, the outer partition mold wall 11 is extracted and then grains of $A_2O_3$-C are charged up to the level D. Finally, the annular space between the core 9 and the inner partition mold wall 10 is charged with the aforementioned pelletized mixture of boron nitride, zirconium oxide, silicon carbide and boron carbide up to the level C. Subsequently, the inner partition mold wall 10 is extracted while the whole nozzle forming mold is shaken and vibrated, and the space between the levels C and D is charged with $Al_2O_3$-C. Then, as shown in FIG. 7, a top cover 13 is fitted to close the upper open end of the mold and the whole mold is placed in a vessel 15 fitted with a liquid 16. Then, a pressure is applied as denoted by arrows 18 by means of a press 17, whereby the materials are compacted and formed by the principle of rubber press. Subsequently, after removing the core 8 and the rubber forming mold wall 9, the compacted body is sintered followed by boring at the bottom as indicated at 6. Then, an anti-oxidation agent is applied to the surfaces of the nozzle and dried, whereby the nozzle 1 of the invention is obtained.

Preferably, the thickness of the inner surface region of the nozzle, in accordance with the present invention, ranges between 5 and 10 mm. This is because, when the thickness is below 5 mm, the effect of prevention of deposition of the non-metallic inclusion is lost in an impracticably short time due to melting, whereas the thicknesses exceeding 10 mm raises the production cost uneconomically.

In the production of the nozzle of integral type, the uniform mixture of the material is pelletized with the aid of organic binder. This is necessary for improving the bulk specific gravity of the material, as well as the formability of the material.

The reason why the grain size of the material is limited to be 5 $\mu$m or below is as follows. During the use of the nozzle, the components of the nozzle material such as boron nitride, silicon carbide and boron carbide react with oxygen in the molten steel so as to be gasified. Consequently, fine pores are left in the surface as a result of extinction of the solid grains. If the grain size of the material is greater than 5 $\mu$m, the sizes of the pores are correspondingly large so that the inner peripheral surface defining the nozzle port is undesirably coarsened to allow an easy deposition of non-metallic inclusions. To avoid this problem, it is necessary that the grain size of the material is 5 $\mu$m or smaller.

The pelletizing of the material into pellets of grain size of 5 $\mu$m or smaller offers also the following advantage in addition to the improvement in the bulk specific gravity and the formability. Namely, grain sizes greater than 5 $\mu$m undesirably increase the amount of the binder used and enhance the tendency of cracking after the sintering. The use of grains of 5 $\mu$m or smaller contributes to prevention of such problems.

The continuous casting nozzle of the present invention thus formed provides a smooth inner peripheral surface which exhibits a large anti-wetting characteristic against non-metallic inclusions, thereby suppressing the tendency for the nozzle port to be restricted and blocked. In the inner surface region of the nozzle, in accordance with the present invention, the grains of the material are bonded mainly by the organic binder. The bonding strength is enhanced by carbon bonding and promotion of the sintering effect produced by silicon carbide and boron carbide, thus offering improved resistance to erosion.

Embodiments of the continuous casting nozzle of the present invention will be described with reference to FIGS. 1 to 4.

FIG. 1 is a sectional view of a continuous casting nozzle embodying the present invention. The nozzle has an outer peripheral region 3 made of an $Al_2O_3$-C type sintered material, an outer peripheral slag-line portion 5 formed from a $ZrO_2$-C type sintered refractory material and an inner peripheral surface region 4 which is made from BN-$ZrO_2$-SiC-$B_4$C-C type sintered refractory material over the entire axial length thereof.

FIG. 2 shows another embodiment in which the outer peripheral region 3 and the outer peripheral slag-line portion 5 are made of $ZrO_2$-C type sintered refractory material and $ZrO_2$-C type sintered refractory material, respectively, as in the embodiment shown in FIG. 1. In the embodiment shown in FIG. 2, however, the BN-$ZrO_2$-SiC-$B_4$C-C type sintered refractory material is used not only in the entire part of the inner peripheral surface region but also in the portion 6 of the nozzle defining a discharge opening.

Figure 3:
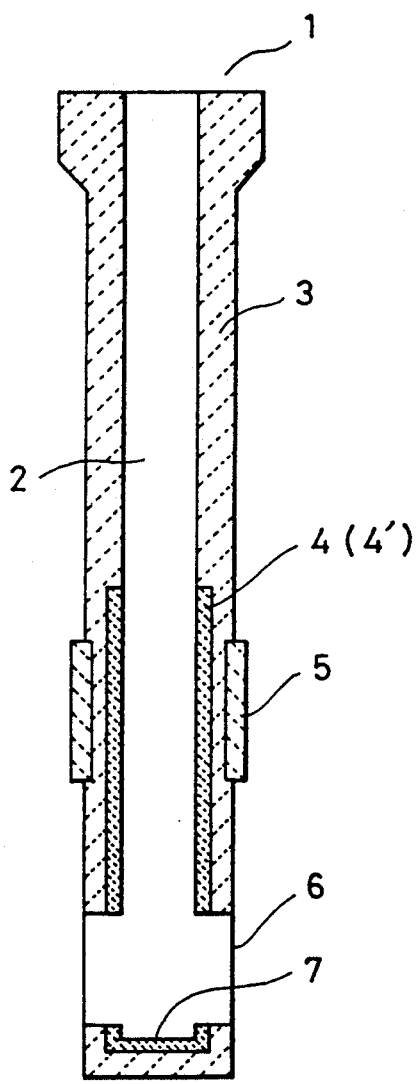
Figure 4:
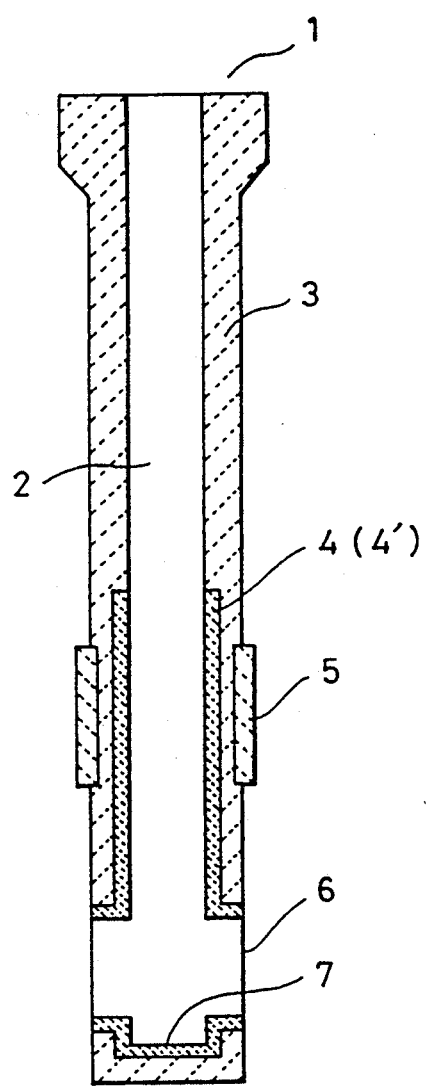

FIGS. 3 and 4 show different embodiments which are basically the same as the embodiments of FIGS. 1 and 2 except that the BN-$ZrO_2$-SiC-$B_4$C-C type sintered refractory material is used only in the lower part of the inner peripheral surface region 4.

EXAMPLE 1

A mixture was formed from 65 wt % of boron nitride (BN) having grain sizes not greater than 5 $\mu$m and a mean grain size of 3 $\mu$m, and 35 wt % of zirconium oxide ($ZrO_2$) having the same grain sizes and mean grain size as BN. Then, 5 wt % of powder of silicon carbide (SiC) having a mean grain size of 2 $\mu$m and 5 wt % of boron carbide ($B_4$C) having a mean grain size of 2 $\mu$m were added as sintering assistants to the mixture. The mixture containing the sintering assistants were then uniformly kneaded together with water in a ball mill so as to form an aqueous slurry of a high density. The aqueous slurry was molded in a gypsum mold having an inside diameter of 80 mm and a length of 900 mm so as to become a cylindrical blank which is 80 mm in outside diameter, 70 mm in inside diameter and 900 mm in length and having a bottom of 5 mm thick. The tubular blank was then calcined for 3 hours in an $N_2$ gas atmosphere of 1200° C. and $9 \times 10^4$ Pa in an electric oven. The calcined cylindrical blank was fixed to the surface of the bore of an immersion nozzle by means of a joint filling material formed by kneading aluminum powder of 74 $\mu$m or smaller together with an aluminum phosphate type binder, whereby a continuous casting nozzle of the present invention was obtained.

The continuous casting nozzle thus produced was mounted in one of two discharge ports of a tundish having a capacity of 60 tons, while a conventional nozzle of aluminum graphite type, having an inner surface region made from a material containing 25 wt % of CaO and 75 wt % of $ZrO_2$, was mounted in the other discharge port. Using this tundish, consecutive seven charges of a low carbon aluminum killed steel, containing 0.04 to 0.05 wt % of C, 0,01 to 0.05 wt % of Si, 0.2 to 0.3 wt % of Mn and 0.02 to 0.06 wt % of Al, were executed The amount of each charge was 260 tons and the charging rate was controlled to 4 tons per minute for each discharge port by a sliding gate. The sliding gate for the discharge port having the conventional nozzle was opened almost fully from the beginning of the fifth charge, whereas, the the opening degree of the sliding gate associated with the nozzle of the present invention was as small as 50 to 60% at the end of the seventh charge.

After the completion of seven consecutive charges, the nozzles were demounted for examination of the amount of deposition of the non-metallic inclusions. In the conventional nozzle, non-metallic inclusions were deposited to a thickness of 18 mm at the maximum on the inner surface thereof, whereas the amount of deposition of non-metallic inclusions was only slight in the nozzle of the present invention. It is therefore clear that the present invention is quite effective in preventing blocking of the nozzle port.

Sample Nos. 1 to 5 of nozzles of the invention were produced by using different cylindrical blanks formed from different compositions with various contents of boron nitride, zirconium oxide and sintering assistants.

These nozzles were tested for the purpose of examination of performance, the results being shown in Table 1. Table 1 also shows the results of tests conducted on nozzles Sample Nos. 7 to 11 which were produced under conditions which did not meet the requirements of the invention.

From this Table, it is understood that the Sample Nos. 1 to 5 produced in accordance with the invention are superior to nozzles of Sample Nos. 7 to 11 in all aspects of resistance to thermal shock, deflective strength and anti-blocking characteristic.

TABLE 1

| No. | BN (%) | $ZrO_2$ (%) | Sintering Assistant | Resistance to Thermal Impact*1 | State of Deposition*2 | |
|---|---|---|---|---|---|---|
| 1 | 52 | 48 | 5 | >1000 | 4.0 | Example of Invention |
| 2 | 78 | 22 | 5 | >1000 | 2.3 | Example of Invention |
| 3 | 65 | 35 | 9 | >1000 | 2.8 | Example of Invention |
| 4 | 53 | 47 | 8 | >1000 | 3.7 | Example of Invention |
| 5 | 75 | 25 | 8 | >1000 | 2.9 | Example of Invention |
| 6 | 64 | 36 | 9 | >1000 | −1.5 | Example of Invention |
| 7 | 65 | 35 | 15 | 650 | 9.5 | Comparison Example |
| 8 | 65 | 35 | 1 | 800 | Melt down*3 | Comparison Example |
| 9 | 65 | 35 | 3 | 800 | Melt down*3 | Comparison Example |
| 10 | 45 | 55 | 5 | 800 | Blocke*4 | Comparison Example |
| 11 | 90 | 10 | 5 | >1000 | Melt down*3 | Comparison Example |

*1: Quenching temperature which reduces strength at normal temperature to half.
*2: Mean thickness of deposition after passage of 2000 tons of Al killed steel.
*3: Molted down after passage of 1000 tons of Al killed steel.
*4: Blocked after passage of 1800 tons of Al killed steel.

EXAMPLE 2

A uniform mixture of grains, having a mean particle size of 10 to 20 μm was formed by wet-kneading the grains of components of the composition (I) for the inner surface region of the nozzle shown in Table 2. The grains sizes of the respective components were not greater than 5 μm. To this uniform mixture was added 8 wt % of a phenol resin and the mixture was pelletized into pellets of 1 to 2 mm. On the other hand, a rubber press was prepared which had a rubber mold frame 9, the interior of which is divided by partition mold walls 10 and 11. The inner space was charged with the above-mentioned pellets, while the outer space was charged with $A_2O_3$ type material having the composition shown in column (II) of Table 2. At the same time, a $ZrO_2$-C type material of the composition shown in the column (III) of Table 2 was charged in the slag-line portion 5. The rubber press was vibrated to fill up all the spaces with these materials. Subsequently, the partition mold walls were extracted and the top cover was placed on the rubber press to completely seal the interior of the rubber mold 9. The rubber mold 9 was then placed in the pressurizing cylinder 15 of the rubber press and was pressurized at a pressure of 900 kg/cm² thereby compacting the materials.

The blank thus formed by the rubber press was placed in a sheath charged with coke powder and was calcined at 950° C. The calcined blank was then cut into final shape and an anti-oxidation agent was applied to the surfaces followed by drying, thus obtaining a continuous casting nozzle having an inner surface region composition made of a BN-$ZrO_2$-SiC-$B_4$C-C type refractory material, an outer peripheral region made of $Al_2O_3$-C type refractory material and and an outer peripheral slag-line portion made of $ZrO_2$-C type refractory material.

COMPARISON EXAMPLE 2

A continuous casting nozzle was produced in which the whole part of the nozzle was made from $Al_2O_3$-C type refractory material of the composition shown in column (II) of Table 2, with the outer peripheral slag-line portion made from the composition of column (III) of Table 2.

A test was conducted by using Example 2 of the nozzle of the invention and the nozzle of the Comparison Example 2 described above. The nozzle of Comparison Example 2 showed a reduction in the charging rate from the later half period of the fourth charge even when the sliding gate was opened almost fully, whereas Example 1 of the nozzle of the invention could perform all the charges without substantial reduction with the opening degree of the sliding gate maintained between 50 and 60%. After the charging tests, the nozzles were demounted for examination of deposition of non-metallic inclusions. In the nozzle of comparison example 2, non-metallic inclusions were deposited in a thickness of 20 mm, whereas the nozzle of the present invention showed almost no deposition, although the inner surface of this nozzle was molten by about 1 to 2 mm in thickness. Example 2 of the nozzle of the invention is shown as Sample No. 6 in Table 1.

TABLE 2

| Inner surface region (I) | | | $Al_2O_3$-C region (II) | | | $ZrO_2$-C region (III) | | |
|---|---|---|---|---|---|---|---|---|
| Composition ratio | | | | | | | | |
| BN | 5 μm or less | 60(%) | Sintered $Al_2O_3$ | 0.3 mm or less | 62(%) | Electro-molten stabilized $ZrO_3$ | 0.3 mm or less | 60(%) |
| $ZrO_2$ | 5 μm or less | 30(%) | Phosphor graphite | 1 mm or less | 30(%) | Phosphor graphite | 1 mm or less | 30(%) |
| SiC | 5 μm or less | 5(%) | Pitch | 0.3 mm or less | 5(%) | Pitch | 0.3 mm or less | 5(%) |
| $B_4$C | 5 μm or less | 5(%) | Si | 0.2 mm or less | 3(%) | Si | 0.2 mm or less | 5(%) |
| Phenol resin | | 8(%) | Phenol resin | | 5(%) | Phenol resin | | 5(%) |
| Properties of materials | | | | | | | | |
| Porosity | | 18.0(%) | Porosity | | 18.0(%) | Porosity | | 18.0(%) |
| Bulk specific gravity | | 2.05 | Bulk specific gravity | | 2.40 | Bulk specific gravity | | 2.82 |
| Deflective | 85 (kg/cm²) | | Deflective | 70 (kg/cm²) | | Deflective strength | 70 (kg/cm²) | |

TABLE 2-continued

| Inner surface region(I) | | $Al_2O_3$-C region (II) | | $ZrO_2$-C region (III) | |
| --- | --- | --- | --- | --- | --- |
| strength | | strength | | | |
| Chemical composition | | | | | |
| BN | 58.0(%) | $Al_2O_3$ | 58.5(%) | $ZrO_2$ | 58.1(%) |
| $ZrO_2$ | 29.0(%) | C | 28.4(%) | C | 29.3(%) |
| SiC | 4.5(%) | $SiO_2$ | 12.5(%) | CaO | 2.4(%) |
| $B_4C$ | 4.5(%) | | | $SiO_2$ | 8.5(%) |
| C | 4.5(%) | | | | |

From these facts, it is clear that the nozzle of the present invention is quite effective in preventing blocking of the nozzle port. It was also confirmed that the nozzle of the present invention produces the same advantages also when applied to ordinary ingot-making casting nozzle, although a continuous casting nozzle has been specifically described.

Thus, the continuous casting nozzle of the present invention enables a stable continuous casting over many number of charging cycles without any risk of restriction of the flow of molten metal which may otherwise be caused by deposition of non-metallic inclusions.

What is claimed is:

1. A nozzle for use in continuous casting comprising an inner surface region defining the nozzle port for passing a molten steel, said inner surface region being formed from a mixture having a composition containing 50 to 80 wt % of boron nitride (BN) and 20 to 50 wt % of zirconium oxide ($ZrO_2$), and a sintering assistant composed of silicon carbide (SiC) and boron carbide ($B_4C$) mixed at a weight ratio of 1:1, said sintering assistant being added in amount of 5 to 10 wt parts to 100 wt parts of said mixture.

* * * * *